United States Patent [19]

Gautherin et al.

[11] Patent Number: 4,675,796

[45] Date of Patent: Jun. 23, 1987

[54] HIGH SWITCHING FREQUENCY CONVERTER AUXILIARY MAGNETIC WINDING AND SNUBBER CIRCUIT

[75] Inventors: George A. Gautherin, Woodside; Sol Greenberg, Roslyn, both of N.Y.

[73] Assignee: Veeco Instruments, Inc., Melville, N.Y.

[21] Appl. No.: 735,217

[22] Filed: May 17, 1985

[51] Int. Cl.$^4$ ............................................. H02H 7/122
[52] U.S. Cl. ........................................ 363/20; 363/24; 363/56; 363/134
[58] Field of Search .................. 336/170, 180; 361/91; 363/20, 21, 24–26, 56, 91, 133, 134

[56] References Cited

U.S. PATENT DOCUMENTS

| | | | |
|---|---|---|---|
| 3,553,620 | 1/1971 | Cielo et al. | 363/25 |
| 3,694,726 | 9/1972 | Cielo et al. | 363/25 |
| 4,538,219 | 8/1985 | Morris et al. | 363/26 |
| 4,561,046 | 12/1985 | Kuster | 363/56 |
| 4,607,322 | 8/1986 | Henderson | 363/24 |

FOREIGN PATENT DOCUMENTS 22380  2/1982  Japan .................................. 363/21

Primary Examiner—William H. Beha, Jr.
Attorney, Agent, or Firm—Morgan & Finnegan

[57] ABSTRACT

An integrated magnetic assembly for use in the direct current output circuit of a high frequency electronic switching power supply, comprising magnetic core sections for the output transformer and inductor windings and a common magnetic core segment completing the magnetic flux paths for the transformer and inductor windings. An auxiliary winding on one or both of the core sections is supplied with energy from the capacitor of a snubber circuit connected across the primary side of the magnetic output circuit. This auxiliary winding is magnetically coupled to the secondary side of the magnetic circuit to transfer energy to the power supply output during a portion of the switched current cycle.

22 Claims, 11 Drawing Figures

HIGH SWITCHING FREQUENCY CONVERTER AUXILIARY MAGNETIC WINDING AND SNUBBER CIRCUIT

This invention relates to a magnetic assembly for use in the output circuit of electronic high frequency switching power supplies, and to power supplies which may usefully incorporate such assembly.

BACKGROUND OF THE INVENTION

Electronic switching power supplies have all but replaced the previously conventional type of power supply using series regulation in the output circuit. In modern applications, both power density (i.e., watts/volume) and power loss in the form of heat dissipation have become important and sometimes overriding factors. With increasing power density, more attention must be devoted to power losses and heat dissipation since, with the high electronic density found in modern computers and the like, the elmination of even relatively small avoidable power losses is an appreciable advantage. Minimization of the physical size of the power supply is similarly important and, of course, it is desireable that these objectives be obtainable at a reasonable cost.

One source of lost power in conventional switching power supplies is the output circuit, which includes an output transformer. This transformer has at least one primary winding receiving switched output current from a device, e.g., a high power switching transistor. Its secondary winding couples the switched power output to an output filter circuit that includes rectifying elements and a filter capacitor across which the output voltage is developed. Conventionally, the output circuit also includes an inductance, either as part of the output filter circuitry, or to supply current to the output filter capacitor during a segment of the switching cycle in which the switching device is open. The foregoing arrangement is found on both single-ended and balanced types of power supplies. In the former case, a single switching device is used, and switched current ordinarily is coupled to the output circuit through a single primary transformer winding and a single secondary winding. The latter type of supply implements at least two switching devices operating in alternation, and an output transformer which may take a number of configurations.

As is well understood in the art, the switched current is coupled through the output circuit transformer and converted by output rectifiers and the filter into a direct current output. Regulation of the output parameter, e.g., output voltage, is gained by controlling the duty cycle of switch operation. Control of the switched power duty cycle is obtained by continuously and automatically adjusting the duration of switch activation in accordance with incremental variations in the line and output voltages.

It has been the practice of the industry to maintain the output transformers and inductors as separate electrical components. Thus, the output transformer and the output inductor are kept physically and electrically independent. This independence has been continued even where, as in some prior art devices, the inductor includes a primary winding, in series with the transformer primary winding, poled to establish magnetic flux in the inductor core when the switching device is closed and to induce in a secondary winding a voltage of appropriate output polarity when the switching device is open.

The use of separate and completely independent magnetic components in the output circuit tends to increase manufacturing costs and add to the overall size of the power supply. We have found that the output transformer and the output inductor can be physically combined, and to a degree magnetically combined, so as to create a unitary structure which reduces manufacturing costs and provides an important savings in space on the power supply chassis. As explained in more detail below, the uniting of the output transformer and inductor includes the use of a common magnetic core segment which completes the magnetic flux paths resulting from exciting the transformer primary with switched output current. This common core segment also completes the path for flux established by current flowing through the inductor winding.

The common core segment is feasible, in part, because of the smaller operating excursions required in power supplies operating at high switching frequencies. This reduced amplitude of the flux excursions minimizes hysteresis and eddy current losses in the magnetics and also allows the common magnetic core section to accomodate both the inductor flux and the transformer flux without any significant increase in cross-sectional area of the core.

We have further discovered that the integrated magnetic output device, described briefly above, can advantageously incorporate an auxiliary winding for coupling leakage inductance energy from the transformer and/or inductor primary winding to the output.

In switching power supplies, some measures are required to avoid impressing excessive induced voltages across the switching device (usually a semiconductor) when it transfers from the closed state to the open state. If the switched current is suddenly terminated, the voltage induced in the primary side of the transformer by the sudden collapse of current is capable of reaching enormous values. Unless something is done, the induced voltage can well exceed the breakdown voltage of the switching semiconductor. The practice in the art has been to shunt the primary winding of the transformer with some means of absorbing the leakage inductance energy in the transformer. Typically, such shunt includes a capacitor and a diode for establishing a current loop whereby the transformer primary current is used to charge the capacitor when the switch is open. When the switch again closes the energy stored on the capacitor is dissipated through a discharge path including the switch and a resistive element.

In accordance with the present invention, we have found that the leakage inductance energy from the transformer and associated wiring can be utilized to augment the power output capacity. This is achieved by transferring the stored capacitor energy (derived from the leakage inductance) to the inductor output winding (or to the transformer secondary) via an auxiliary winding magnetically coupled thereto. Current in the auxiliary winding sets up a flux in the magnetic core upon closure of the switch and when the switch opens, the flux induces a voltage that drives the output. Because this energy is supplied to the output circuit, it contributes to the power output demand and therefore increases the power supply efficiency.

SUMMARY OF THE INVENTION

The present invention thus embraces an integrated magnetic assembly for use in the direct current output circuit of an electronic switching power supply comprising a transformer, an inductor, magnetic core sections providing part of a respective closed magnetic flux path for the transformer and the inductor, and a common magnetic core element joined to such magnetic core sections and completing the magnetic flux paths for the transformer and the inductor.

The invention also embraces a magnetic coupling device, preferably as described above, having an auxiliary winding wound on one of the core sections and magnetically coupled to one of the windings in the direct current output circuit so as to transfer energy to the power supply output during a portion of the switched current cycle. In the preferred embodiment of a power supply incorporating such a device, the auxiliary winding is supplied with energy from the capacitor of a "snubber circuit" connected across the transformer and inductor primary windings.

BRIEF DESCRIPTION OF THE DRAWINGS

A more complete understanding of the invention will be gained from the following detailed description of the preferred embodiments and from the accompanying drawings, in which.

DETAILED DESCRIPTION OF THE PREFERRED EMBODIMENTS

To better understand the invention, it is helpful to understand the general operation of switching power supplies and to review some of the practices of the prior art.

Figure 1A:
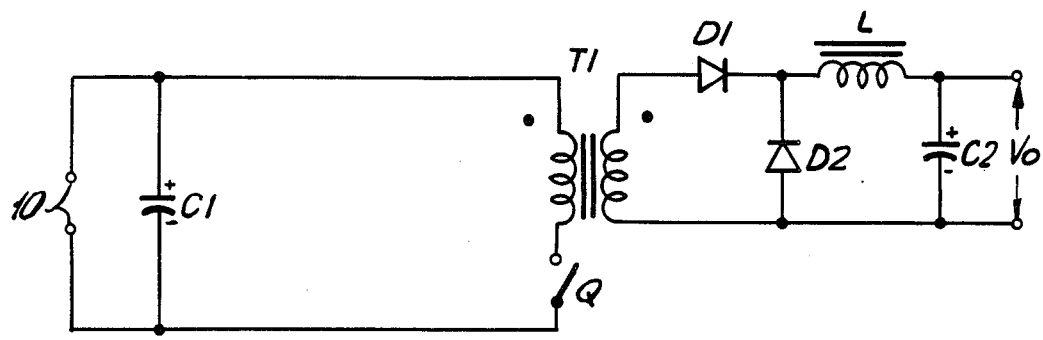
FIGS. 1A and 1B are electrical schematic diagrams of two types of prior art switching power supplies illustrating specifically the magnetic output circuits for such supplies.
Figure 1B:
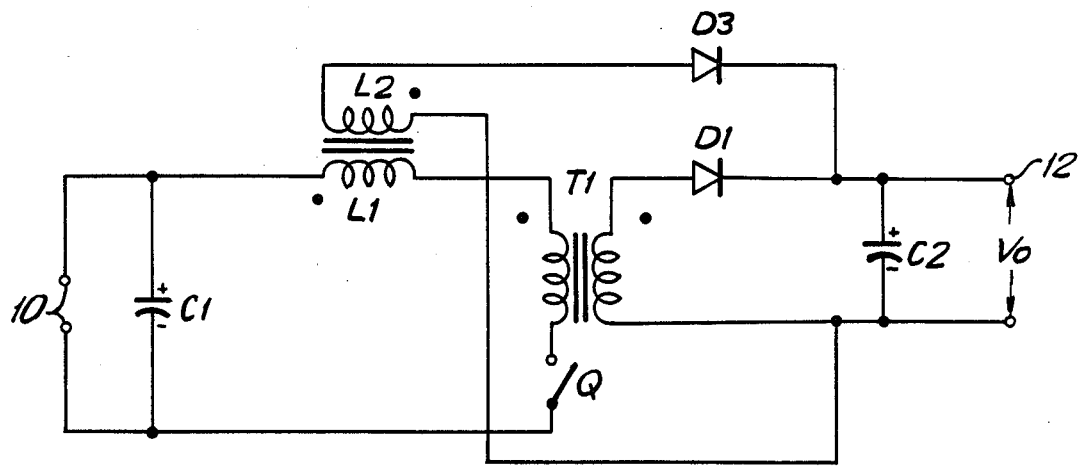

FIGS. 1A and 1B illustrate two types of known electronic switching power supplies. Each of the figures illustrates only the output circuits for the power supplies; the electronic control circuits for regulating the switching frequency and duty cycle have been omitted for clarity.

Referring to FIG. 1A, depicting a single-ended type of supply, rectified input power is applied to the input terminals 10 and from there to the input filter capacitor C1 across which is developed a direct current input voltage. This input voltage is applied across the primary circuit of the output transformer T1, whose primary winding is wired in series with the power switching device Q. On the drawing, the switch is shown in the form of a mechanical switch; however, in practice, the switch is almost always a high power switching transistor. The switching device Q is controlled by circuits (not shown) which respond to variations in the line and output voltages in order to maintain the output parameter (e.g., output voltage $V_o$) at the regulated level.

The power supply has a direct current output circuit for transforming switched output current into direct current. As shown, a representative output circuit utilizes rectifying diodes D1, D2 for supplying rectified current to output filter inductor L through which rectified, filtered output current flows to the output terminals. Output voltage is developed across capacitor C2.

FIG. 1B represents a more recent evolution of the switching power supply concept in which the single output inductor L is replaced with an inductor having a primary winding L1 and a secondary winding L2. Windings L1 and L2 are poled so that L2 is of output polarity when switch Q is open. Diode D3 is reverse-biased when switch Q is closed and the secondary winding of transformer T1 is driving the output. Thus, when switch Q is closed, induced voltage in the inductor output winding L2 is oppositely polarized relative to the output voltage $V_o$. However, when switch Q opens, winding L2 drives the output.

Figure 2:
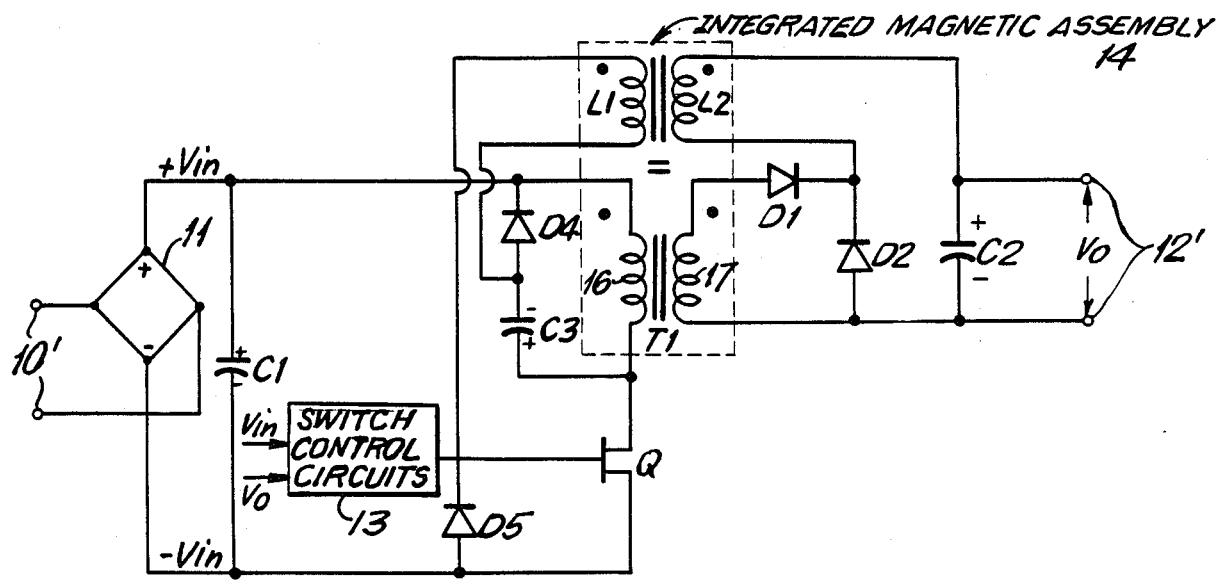
FIG. 2 is an electrical schematic diagram of a conventional type of switching power supply incorporating the integrated magnetic assembly of the invention.
Figure 3:
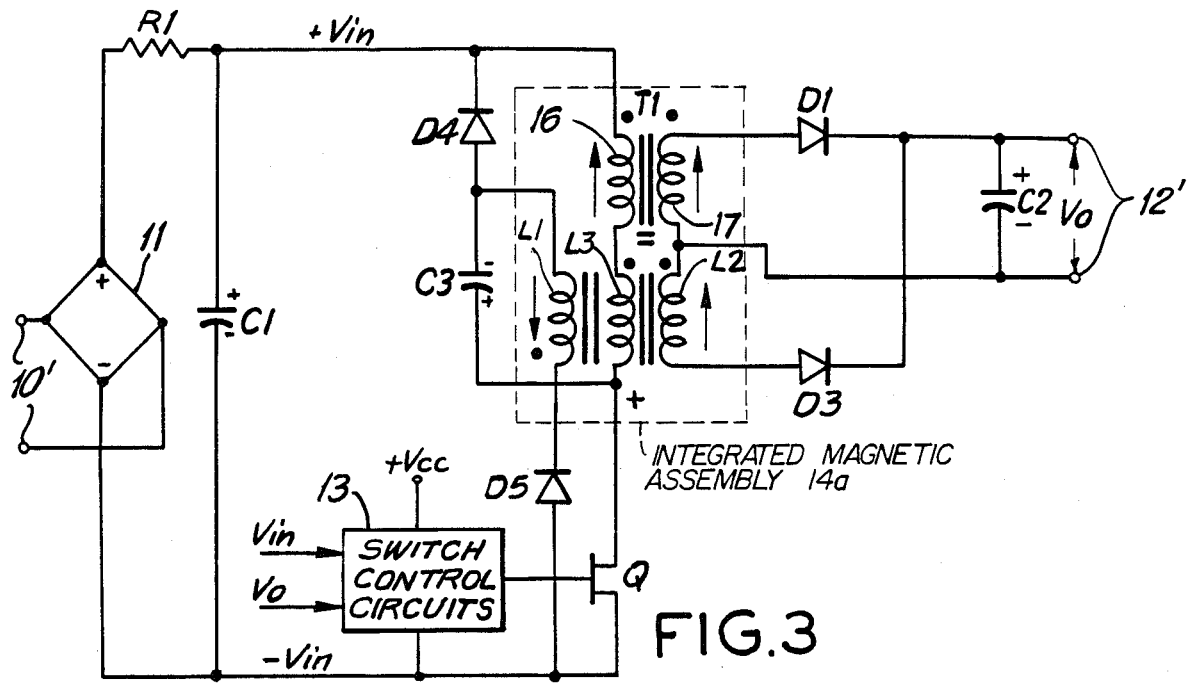
FIG. 3 is an electrical schematic diagram of an electronic switching power supply in accordance with the invention and also incorporating the preferred integrated magnetic assembly disclosed herein wherein an auxiliary winding is incorporated on a unitary magnetic core.

As earlier discussed, one aspect of the invention is a magnetic assembly which combines the output transformer and inductor elements on a unitary core structure. FIGS. 2 and 3 depict switching power supplies incorporating such integrated magnetic assemblies.

The power supply of FIG. 2 includes a conventional circuit 11 for rectifying the alternating current source current applied at terminals 10'. This rectified source current feeds input filter capacitor C1. As shown, the switching device Q is a field effect transistor whose switching action is controlled by a signal applied to the gate electrode, such signals being developed by the switch control circuits 13. Circuits 13 can receive, as inputs, voltages proportional to controlling parameters such as line voltage $V_{in}$ and output voltage $V_o$. The switch operates at high frequency, i.e. a switching frequency in excess of 50 KHz and typically 100 KHz. In accordance with the invention, inductor output winding L2 is physically associated with transformer T1 so as to form a unitary magnetic assembly 14 in the form described below.

The magnetic assembly of the power supply of FIG. 2 also incorporates an additional, or auxiliary, winding L1 which cooperates with a "snubber" circuit comprised of capacitor C3 and diode D4, the snubber circuit being connected across the transformer primary winding 16. Winding L1 is connected in series with diode D5 between the $-V_{in}$ conductor and the junction of C3, D4, ahnd is part of the unitary magnetic assembly described herein.

The shunt path constituted of capacitor C3 and diode D4 is proportioned to absorb the leakage inductance energy in the transformer primary circuit and functions with winding L1 to transfer energy recovered from the transformer primary to the output as follows. As semiconductor Q switches off, there is a rapid decline in switched current with a consequent build-up in the induced voltage primarily attributable to the leakage inductance seen by the primary side of the magnetic circuit. Snubber circuit diode D4 provides a path for current in the primary to charge capacitor C3 to the polarity shown. Diode D4 precludes current flow in the opposite direction from the direct current input. During the remainder of the switched current cycle, switch Q is closed. This permits capacitor C3 to discharge through diode D5 and auxiliary winding L1, inducing voltage with the winding polarity indicated. A voltage is thereby induced in inductor secondary winding L2 in the direct current output, thus permitting current (and energy) to be transferred from L2 to output terminals 12'. Therefore, the energy trapped in the transformer primary is transferred to the inductor core and thereby to the secondary side of the magnetic circuit. This transfer occurs prior to the main build-up in the output voltage in transformer secondary winding 17.

It is worth noting that auxiliary winding L1 is a component of the integrated magnetic assembly 14, as is preferred. The invention of FIG. 2, however, embraces the provision of a physically and magnetically independent inductor, in which case inductor windings L1, L2 would be wound on a magnetic core that is not associated with the core of transformer T1.

Figure 4:
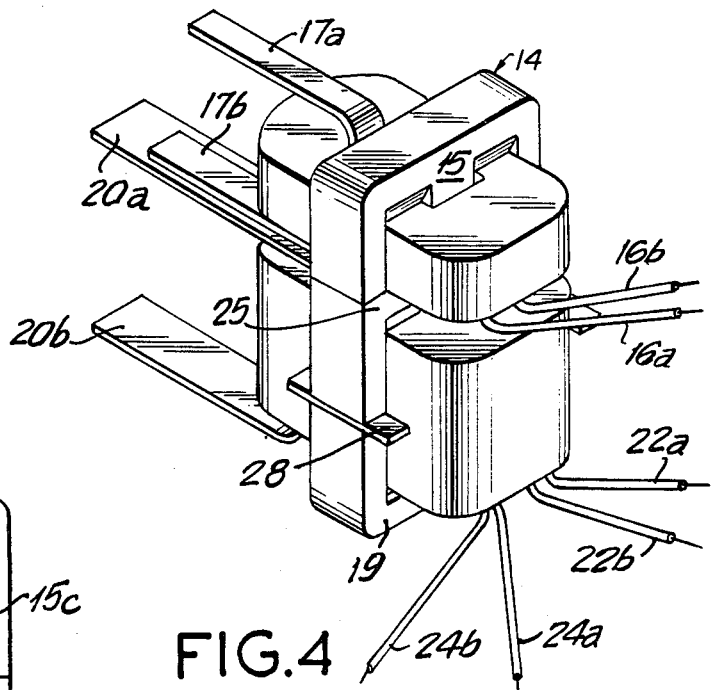
FIG. 4 is a perspective view of the integrated magnetic assembly of the invention.
Figure 5:
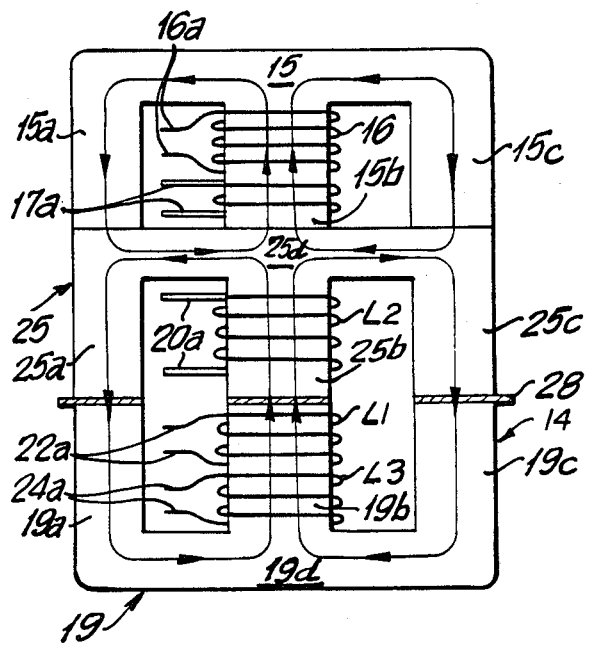
FIG. 5 is a front elevation view of the core structure for the integrated magnetic assembly of the invention.

Referring to FIGS. 4 and 5, a typical magnetic assembly 14 includes an E-shaped transformer magnetic core section 15 having legs 15a, 15b and 15c, this core section forming part of closed magnetic flux path linking the primary and secondary windings 16, 17 of the transformer. Connections are made to the transformer through primary leads 16a and secondary leads 17a.

The magnetic assembly also includes an inductor composed of two mating E-shaped magnetic inductor core sections 19, 25 comprising legs 19a–19c and 25a–25c, respectively, and a respective base portion 19d, 25d. Although the core sections are illustrated as having an E-shaped geometry, other conventional core forms can be used. The inductor magnetic core sections together form part of at least one closed magnetic flux path. At the join line of the legs of the two E-sections is a thin paper separator 28 presenting a narrow gap to inhibit core saturation by the flux set up by dc current drain. An inductor winding L2 is located on central leg 25b/19b and is adapted for connection in the output circuit to supply output current to the output terminals 12' of the supply. Inductor winding L2 terminates in leads 20a which, as seen in FIG. 4, are of sufficient size to minimize power losses.

The magnetic assembly illustrated in FIG. 4 further comprises one or more additional inductor windings for use in circuits of the type shown in FIGS. 2, 3, 7 and 8. Specifically, winding L1 with leads 22a is wound on the same leg of the core and is thereby magnetically coupled to winding L2. A further winding L3, which is used in the circuits of FIGS. 3 and 8, and whose function will be described shortly, is also wound on the central core leg and terminates in leads 24a. Thus, for a single output power supply, the inductor may carry a total of two or more windings all magnetically coupled, whereas the transformer is consituted of at least the conventional two windings plus an auxiliary transformer winding for circuit configurations such as FIGS. 3 and 8. Of course, for a multiple output power supply, additional inductor and transformer windings would be implemented.

As best seen in FIG. 5, the common magnetic base segment 25d of core section 25 is mated to the transformer core section 15 so as to form a unitary physical core structure. This common core segment 25d completes each of the magnetic flux paths for the transformer and inductor and thereby carries magnetic flux resulting from current flowing through the windings in both the transformer and the inductor. The windings preferably are electrically poled such that the a.c. components of the magnetic fluxes of the transformer and inductor, diagramatically illustrated in FIG. 5, are of opposite polarity in the common magnetic core segment and thereby are subtractive therein. In this manner, the cross section of core member 25d can be maintained at a minimum and, because a portion of the magnetic core mass is shared by both the transformer and inductor, the overall physical mass and size of the assembly is reduced. As a consequence, a switching power supply implementing the magnetic assembly of the invention is both reduced in size and, in view of the common magnetic structure, is more economic to manufacture.

Figure 6:
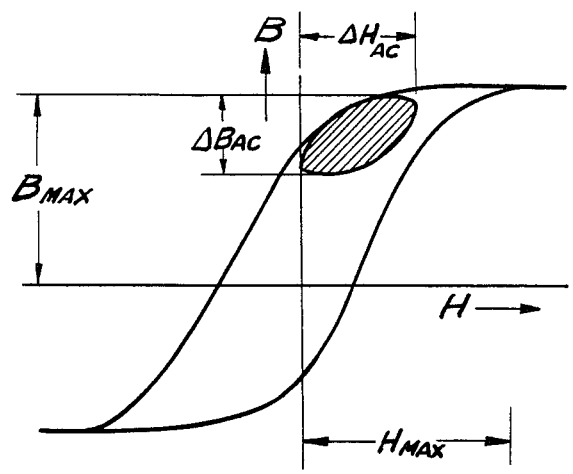
FIG. 6 is a graph of the B/H characteristic for a transformer core of the type used in switching power supplies, such diagram being useful in explaining certain principles involved in the new integrated assembly described.

Turning to the B/H graph of FIG. 6, the familiar loop will be recognized. The shape of this loop is typical for core materials, in this case a ferrite material because of the necessity for operating at high switching frequencies. However, because the voltage developed in the transformer as a result of the switched primary current is proportional to frequency, the flux excursion $B_{ac}$ needed to drive the transformer is significantly less than would be required at low frequencies. The operating range of the transformer consequently may be restricted to the shaded area illustrated in FIG. 6. Accordingly, the magnetic core has a capacity for accomodating additional flux without saturating and, in the present invention, that capacity is utilized to accomodate the magnetic flux of the inductor. The magnetic core may thus be operated within the limit of $B_{max}$ with the superposition of the inductor d.c. flux and transformer a.c. flux in the magnetic core segment. Stated another way, integrating the inductor and transformer does not result in any increase in the bulk of the core and, instead, permits these two electromagnetic elements to be compressed into a unitary structure with reduced total mass and size.

We refer now to another switching power supply embodiment of the invention, illustrated in FIG. 3. Like the circuit of FIG. 2, this circuit embodies an input rectifier 11, filter capacitor C1 and switch control circuits 13 for operating the output switch Q (a field effect transistor) at a switching rate in excess of 50 KHz. Switching device Q is connected in series with the transformer primary 16, as well as a primary inductor winding L3. Transformer secondary winding 17 is connected in a conventional manner to supply output current via recitifier D1 to output filter capacitor C2 across which the output voltage Vo appears. Inductor windings L1–L3 are magnetically coupled and poled as shown, so that the voltage induced in winding L2 causes diode D3 to conduct when diode D1 is non-conductive. Thus, transformer secondary winding 17 and inductor output winding L2 supply output current to the power supply output terminals during alternate parts of the switched current cycle. The output circuit magnetics are incorporated into an integrated magnetic assembly 14a.

In operation, when switching device Q transfers to the open state, there is a rapid reduction in the switched current in the primaries of the magnetic circuits. This reverses the polarity of the voltages induced in the primary windings 16 and L3. As discussed in connection with FIG. 2, in order to limit the magnitude of the induced voltage in the primary side of the magnetics, a "snubber" is incorporated to absorb energy from the primary side of the magnetic circuit. Thus the series circuit consisting of capacitor C3 and diode D4 is connected across the primary side of the magnetic circuit, which in this case includes windings 16 and L3. Accordingly, when switch Q opens, an alternate current path is established through capacitor C3 and diode D4 to permit the energy residing in the magnetic circuits to be transferred to and stored in capacitor C3. Capacitor C3 charges to the polarity indicated during this segment of the switched current cycle.

When switching device Q switches back to the closed state, the polarity of the induced primary voltages reverses again. Closure of switch Q creates a discharge path for capacitor C3 through diode D5 and auxiliary winding L1, the latter being connected between $-V_{in}$ and diode D4. This discharge current through winding L1 augments the core energy already existing in the inductor core. The voltage induced in inductor winding L3, during conduction of switch has the effect of storing energy in the inductor core. This stored magnetic energy is released to the output circuit when switch Q opens. In other words, during the segment of the switched current cycle when switch Q conducts, voltage induced on inductor L2 is blocked by diode D3 from appearing at the output terminals. Upon opening of switch Q, the voltage induced on L2 reverses and drives diode D3 into conduction as soon as the induced voltage exceeds the voltage across C2. The energy stored in the inductive core therefore is transferred to the output.

It should be clear from the foregoing description that the circuit of FIG. 3 achieves the dual function of limiting the voltage induced in the magnetic primary circuit, and of storing and transferring the primary magnetic energy to the power supply output. This is distinguished from some circuits found in the prior art in which the energy trapped in the magnetic primary circuits is purposely dissipated in one or more resistive elements. When that approach is used, the dissipated energy represents nothing but wasted power and is accompanied by unwanted generation of heat within the power supply chassis. In the present invention the auxiliary winding on the inductor core transfers energy trapped in the primary side of the magnetic circuit to the direct current output circuit. It is essentially a lossless transfer of useful energy.

Figure 7:
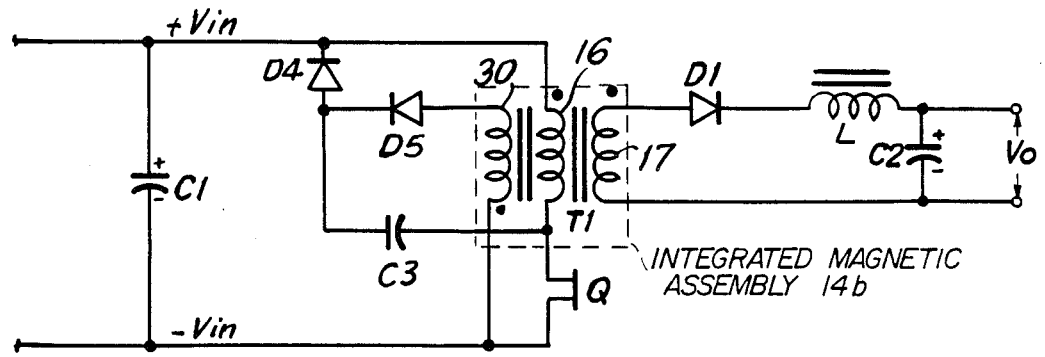
FIGS. 7 and 8 are electrical schematic diagrams of two further embodiments of electronic switching power supplies according to the invention.
Figure 8:
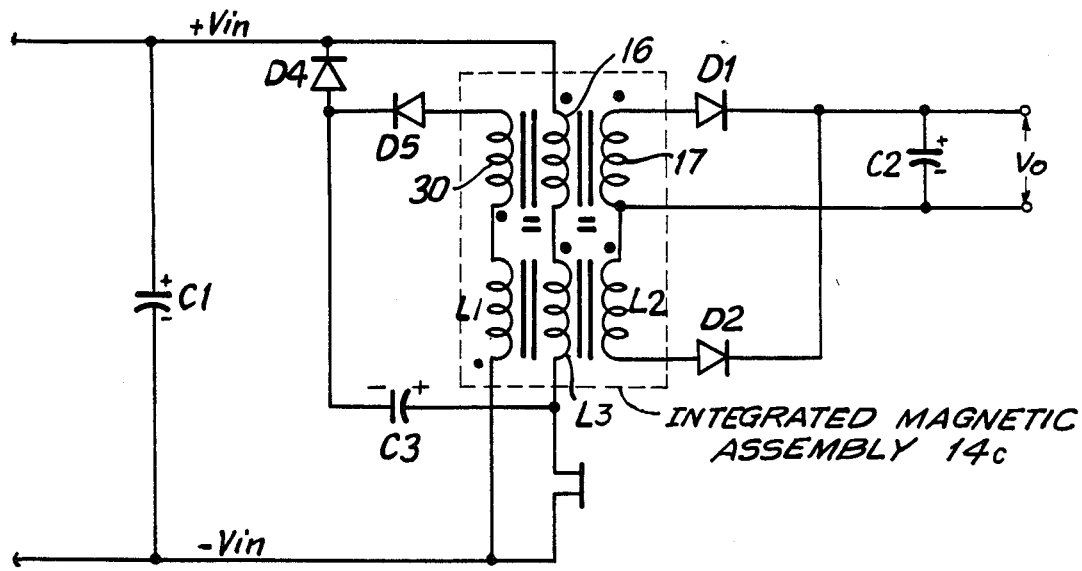

FIGS. 7 and 8 illustrate further embodiments incorporating the foregoing concepts. The circuit of FIG. 7 implements a third, auxiliary, winding 30 on the magnetic core of transformer T1. It is to be noted that this circuit employs a separate inductor L in the direct current output circuit. This inductor, however, may comprise part of the unitary integrated magnetic structure 14b, constructed as described above, with a common magnetic core segment.

A distinctive feature of the FIG. 7 circuit is that stored energy received by the auxiliary winding 30 from capacitor C3 of the snubber circuit is magnetically coupled to the secondary winding 17 of transformer T1. Thus stored energy is used to drive the secondary winding 17. For that purpose, auxiliary winding 30 is poled to induce a voltage of output polarity in secondary winding 17 when switch Q closes and current is flowing therein from capacitor C3. As in the case of the circuits of FIGS. 2 and 3, capacitor C3 is charged when switch Q opens and the voltage induced in primary winding 16 reverses. Unidirectionally conducting diode D4 ensures that charging of snubber capacitor C3 occurs only upon a reduction in switched current, e.g., only when switch Q opens. Energy stored in the snubber circuit is therefore transferred to the output circuit in the initial segment of switched current conduction.

The circuit of FIG. 8 embodies a combination of all of the concepts previously described. Specifically, it utilizes a single, integrated magnetic assembly 14c having primary and secondary transformer windings, primary and secondary inductor windings, auxiliary windings 30, L1 for both the transformer and the inductor, respectively and a snubber C3, D4 connected across the transformer primary winding 16 which, in this case, is also in series with the inductor primary winding L3. The two auxiliary windings are connected in series, and both receive current from snubber capacitor C3 upon closure of switch Q. It should be remarked that the capacitance value of C3 is selected absorb leakage inductance energy in the magnetic primary circuit, which includes output leakage inductance as reflected to the primary side of the magnetics.

In operation, the auxiliary windings in FIG. 8 are effective to induce voltages of output polarity in the transformer and inductor output windings during alternate portions of the switched current cycle. Thus, a voltage of output polarity is induced in transformer secondary winding 17 upon closure of switch Q and the flow of stored current through auxiliary winding 30. During this time period, the voltage induced in inductor output winding L2 is of the opposite polarity and winding L2 therefore transfers no energy at such time to the load. However, the induced voltage in L2 matches the polarity of the output when switch Q again opens, at which time winding L2 is capable of contributing current to the output terminals. In this manner a transfer of energy occurs from each of the auxiliary windings to one of the output windings during alternate portions of the switched current cycle.

Figure 9:
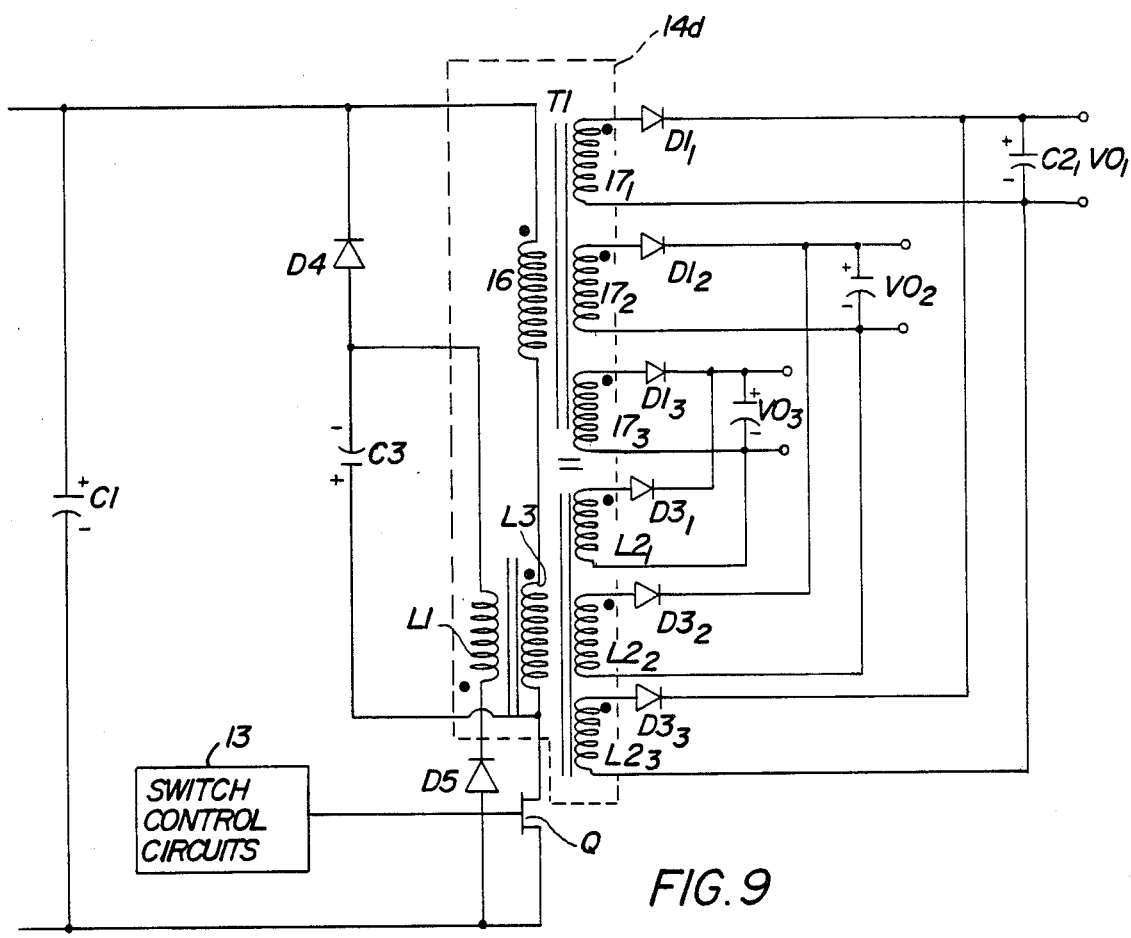
FIG. 9 is an electrical schematic diagram of an electronic switching power supply embodying several concepts of the invention and providing multiple outputs from a single integrated magnetic assembly.

The power supply circuit of FIG. 9 carries forward several of the foregoing concepts in a multiple-output configuration. This circuit operates similarly to the circuit of FIG. 3, except that three separate voltage outputs are provided. For convenience, identical reference numbers have been used for elements corresponding to those in the FIG. 3 embodiment. Preferably, all magnetic elements are contained on an integrated magnetic assembly 14d, as shown, having the general configuration illustrated in FIGS. 4 and 5, the core sections associated with the output transformer T1 and output inductor windings L1–L3 forming a unitary structure housing a common core segment.

Since the circuit of FIG. 9 operates on the same principle as the FIG. 3 embodiment the description of FIG. 3 may be referred to for an explanation of how the elements function. The important additions found in FIG. 9 are the several independent transformer output windings 17₁, 17₂, 17₃ and the corresponding plurality of inductor output windings L2₁, L2₂, L2₃. Each set of output windings is driven by a single primary winding 16, L3, respectively. Similarly the single auxiliary winding L1 drives all three inductor output windings in the manner previously discussed relative to FIG. 3.

Figure 10:
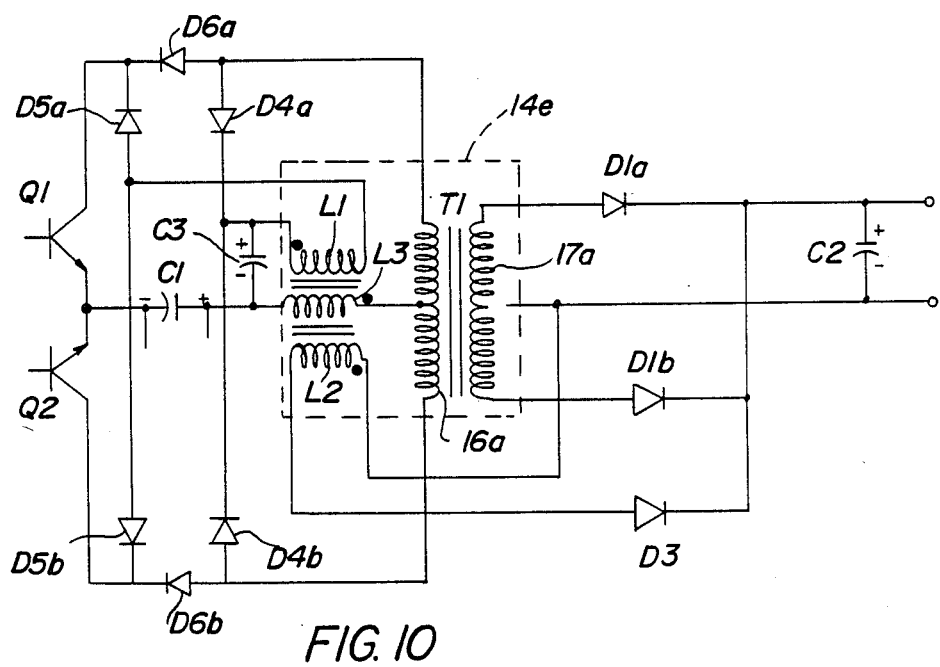
FIG. 10 is an electrical schematic diagram of an electronic power supply of the balanced type according to the invention.

The circuit of FIG. 10 is a balanced type of switching power supply incorporating the invention. It typifies a balanced configuration of power supply corresponding to the single-ended configuration of FIG. 3. Thus it includes an inductor having primary and secondary windings L3, L2, respectively, and an auxiliary inductor winding L1. The output transformer has respective center-tapped primary and secondary windings 16a, 17a, each primary winding being connected in series with one of the two alternately conducting electronic switches Q1, Q2. Capacitor C3 is the energy storage means of the snubber circuit, the unidirectionally conducting diodes D1a, D1b, D3, D4a, D4b, D5a, D5b all performing the same functions as their similarly numerical counterparts in FIG. 3. Diodes D6a, D6b block reverse conduction through the switches of voltages induced in the transformer primary windings.

In operation, upon switch conduction, current flows from the positive terminal of capacitor C1 through the primary magnetic circuit L3, 16a, through diodes D6a or D6b and through switch Q1 or Q2 back to the negative terminal of C1. When either switch opens, leakage inductance energy induces a voltage in the transformer primary winding 16a and charges capacitor C3 through either D4a or D4b. When the other switch closes (in the next half-cycle), capacitor C3 discharges through auxiliary winding L1 and diode D5a or D5b, depending on which switch is conducting. This results in the capacitor C3 energy transferring to the output circuit, due to the consequent induced voltage in the inductor output winding L2.

As before, the magnetic windings of the output circuit are preferably contained on a unitary magnetic structure 14e having the general cores structure illustrated in FIGS. 4 and 5.

Although the invention has been described with reference to the preferred embodiments, it should be understood that certain modifications and variations may be made without departing from the scope and spirit of the invention. For example, the integrated magnetic assembly is shown to have a particular core shape, size and relationship, but changes may be made in the shape and form of the core consistent with the design perameters of the ultimate application. In addition, the principle of using an auxiliary inductor winding to preserve and transfer energy to the output circuit is not dependent upon the specific integrated magnetic assembly disclosed herein. As to that aspect of the invention, while it is highly preferred to use an integrated magnetic assembly, separate transformer and inductor elements could be implemented.

We claim:

1. In an electronic switching supply having switching means for controlling the duty cycle of switched output current and a direct current output circuit for converting switched current into direct current output power:
   a transformer having a primary winding connected for excitation by the switched current, a secondary winding in the direct current output circuit for supplying current to the power supply output, and a magnetic core section providing part of a closed magnetic flux path linking said primary and secondary windings;
   an inductor comprised of a magnetic core section providing part of a magnetic flux path and at least one inductor winding on said magnetic core section connected to supply output current during a portion of the switched current cycle; and
   a common magnetic core segment free of said inductor and transformer windings joined to said transformer and inductor core sections to form a unitary core structure, said common segment completing each of said magnetic flux paths.

2. The electronic switching power supply of claim 1, further comprising:
   at least one auxiliary winding on one of said magnetic core sections; and
   a snubber circuit connected to the transformer primary winding for storing energy received therefrom when the induced voltage thereon is of one polarity and for transferring such energy to said auxiliary winding when such induced voltage is of the opposite polarity,
   said auxiliary winding being effective to induce a voltage of output polarity on the output winding on said one magnetic core section during a portion of the switched current cycle.

3. In an electronic switching power supply having magnetic means for transferring switched current power to a direct current output circuit:
   an output transformer having a magnetic core, a primary winding excited by the switched current and a secondary winding connected to the direct current output circuit for delivery of switched current power thereto;
   an inductor including a magnetic core having primary and secondary windings each wound on such magnetic core, said secondary winding connected to supply direct current to the power supply output during at least part of the switched current cycle in alternation with said transformer secondary winding;
   an auxiliary winding wound on one of said magnetic cores for transferring energy to said one magnetic core during at least a segment of the switched current cycle; and
   a snubber circuit connected across said primary windings to store energy received therefrom upon reduction of the switched current and to transfer such stored energy to said auxiliary winding during a segment of said switched current cycle.

4. In an electronic switching power supply having magnetic means for transferring switched current power to a direct current output circuit:
   an output transformer having a magnetic core, a primary winding excited by the switched current and a secondary winding connected to the direct current output circuit for the delivery of switched current power thereto;
   switch means for providing switched current to said output transformer;
   an inductor in said direct current output circuit and composed of a magnetic core and an output winding thereon connected to supply direct current to the power supply output during at least part of the switched current cycle,
   said inductor magnetic core and said transformer magnetic core comprising a unitary magnetic structure having a common core segment;

an auxiliary winding magnetically coupled to one of said windings of the output circuit for transferring energy to one of said magnetic cores during at least a segment of the switched current cycle;

switch control means for operating said switch at a switching frequency of not less than about 50 kHz; and a snubber circuit connected across said transformer winding to store energy received therefrom upon reduction of the switched current and to transfer such stored energy to said auxiliary winding during a segment of the switched current cycle when said switch means is conductive.

5. In an electronic switching power supply having magnetic means for transferring switched current power to a direct current output circuit:

an output transformer having a magnetic core, a primary winding excited by the switched current and a secondary winding connected to the direct current output circuit for the delivery of switched current power thereto;

an inductor in said direct current output circuit and composed of a magnetic core and an output winding thereon connected to supply direct current to the power supply output during at least part of the switched current cycle;

an auxiliary winding magnetically coupled to one of said windings of the output circuit for transferring energy to one of said magnetic cores during at least a segment of the switched current cycle;

switching means in series with said transformer primary winding;

a snubber circuit connected across said transformer primary winding including a capacitor for storing energy received from the transformer primary winding upon reduction of the switched current, and a unidirectionally conducting element in series therewith for establishing a current path for charging said capacitor; and means for establishing a discharge path for said capacitor through said auxiliary winding during the segment of the switched current cycle when such switched current is flowing in said transformer primary winding, said means including said switching means and unidirectional conducting means for permitting said capacitor to discharge into said auxiliary winding upon operation of the switching means.

6. In an electronic switching power supply having magnetic means for transferring switched current power to a direct output circuit:

an output transformer having a magnetic core, a primary winding excited by the switched current and a secondary winding connected to the direct current output circuit for delivery of switched current power thereto;

an inductor in said direct current output circuit and composed of a magnetic core and an output winding thereon connected to supply direct current to the power supply output during at least part of the switched current cycle;

an auxiliary winding on the transformer magnetic core and magnetically coupled to said transformer secondary winding for transferring energy to said transformer magnetic core during at least a segment of the switched current cycle; and a snubber circuit connected across said transformer primary winding to store energy received therefrom upon reduction of the switched current and to transfer such stored energy to said auxiliary winding during flow of the switched current.

7. The electronic switching power supply of claim 6, wherein said snubber circuit comprises:

a capacitor; and a unidirectionally conducting element in series therewith for establishing a current path for charging said capacitor with energy from said primary winding when the voltage induced therein is of one polarity, the power supply further comprising means for establishing a discharge path for said capacitor through said auxiliary winding during the segment of the switched current cycle when such switched current is flowing in said transformer primary winding.

8. The electronic switching power supply of claim 7, further comprising:

switching means in series with said transformer primary winding, said means for establishing a discharge path including both said switching means and unidirectional conducting means for permitting said capacitor to discharge into said auxiliary winding upon operation of the switching means.

9. The electronic switching power supply of claims 6 or 8, further comprising:

a second auxiliary winding in series with said transformer auxiliary winding on said inductor magnetic core for transferring energy thereto during one period of the switched current cycle.

10. The electronic switching power supply of claim 6, wherein:

said inductor magnetic core and said transformer core comprise a unitary magnetic structure having a common core segment.

11. The electronic switching power supply of claim 10, wherein:

said common core segment provides a common flux path for the inductor and transformer fluxes.

12. The electronic switching power supply of claim 10, further comprising:

switch means for providing switched current to said output transformer; and switch control means for operating said switch at a switching frequency of not less than about 50 KHz.

13. The electronic switching power supply of claims 6 or 5, wherein:

said auxiliary winding is poled to transfer energy to the transformer secondary winding when switched current flows through said transformer primary winding.

14. The electronic switching power supply of claims 6, 9 or 10, further comprising:

an inductor primary winding connected in series with said transformer primary winding and magnetically coupled to said inductor output winding, said inductor primary winding being poled to supply current via said inductor output winding to said output circuit in alternation with said transformer secondary winding.

15. The electronic switching power supply of claims 5 or 3, wherein:

said inductor magnetic core and said transformer magnetic core comprise a unitary magnetic structure having a common magnetic core segment providing a common flux path for the transformer and inductor fluxes.

16. The electronic switching power supply of claims 6, 9, 10, 1 or 2, further comprising:
   at least one supplemental transformer secondary winding on said transformer magnetic core section magnetically responsive to the flux therein, and
   at least one supplemental inductor winding on said inductor magnetic core section magnetically responsive to the flux therein,
   said supplemental windings being adapted for connection in multiple power outputs circuits driving separate electrical loads.

17. In an electronic switching power supply of balanced configuration having magnetic means for transferring switched current power to the output terminals of a direct current output circuit;
   a pair of electronic switching devices adopted for conduction in alternation;
   an output transformer having a magnetic core, at least one center-tapped primary winding connected to receive switched current in response to alternate operation of said switching devices and at least one secondary winding in the direct current output circuit to provide an induced voltage of output polarity to the output terminals of the power supply during each half of the switched current cycle;
   an inductor in said direct current output circuit and composed of a magnetic core and at least one output winding thereon connected to supply direct current to the power supply output terminals during at least part of the switched current cycle;
   an auxiliary winding on one of said cores and magnetically coupled to one of said windings in the output circuit for transferring energy to one of said magnetic cores during at least a segment of the switched current cycle; and
   a snubber circuit connected across the center-tapped segments of said transformer primary winding to store energy received from a respective primary winding segment upon termination of conduction of the switch associated therewith and to transfer such stored energy to said auxiliary winding upon conduction of the other of said switches.

18. In an electronic switching power supply of balanced configuration having magnetic means for transferring switched current power to the output terminals of a direct current output circuit:
   a pair of electronic switching devices adapted for conduction in alternation;
   an output transformer having a magnetic core, at least one center-tapped primary winding connected to receive switched current in response to alternate operation of said switching devices, and at least one secondary winding in the direct current output circuit to provide an induced voltage of output polarity to the output terminals of the power supply during each half of the switched current cycle;
   an inductor in said direct current output circuit composed of a magnetic core and at least one output winding thereon connected to supply direct current to the power supply output terminal during at least part of the switched current cycle;
   said inductor magnetic core and said transformer magnetic core comprising a unitary magnetic structure having a common core segment;
   an auxiliary winding on one of said cores and magnetically coupled to one of said windings in the output circuit for transferring energy to one of said magnetic cores during at least a segment of the switched current cycle; and
   a snubber circuit connected across at least one of the center-tapped segments of said transformer primary winding store energy received from said primary winding upon termination of conduction of the switch associated therewith and to transfer such stored energy to said auxiliary winding upon conduction of the other of said switches.

19. In an electronic switching power supply having magnetic means for trsnsferring switched current power to a direct power output circuit;
   an output transformer having a magnetic core, a primary winding excited by the switched current and a secondary winding connected to the direct current output circuit for delivery of switched current power thereto;
   an inductor composed of a magnetic core, a primary winding excited by the switched current and a secondary winding connected to supply direct current to the power supply output during at least a part of the switched current cycle;
   an auxiliary winding on the inductor magnetic core for transferring energy to said inductor magnetic core during at least a segment of the switched current cycle; and
   a snubber circuit connected across at least one of said primary windings to store energy received therefrom upon reduction of the switched current and to transfer such stored energy to said auxiliary winding during a segment of the switched current cycle.

20. The electronic switching power supply of claim 19, wherein:
   said inductor and transformer magnetic cores comprise a unitary magnetic structure having a common core segment.

21. The electronic switching power supply of claim 20, wherein:
   said common core segment provides a common flux path for the inductor and transformer fluxes.

22. The electronic switching power supply of claim 19, wherein:
   said inductor and transformer primary windings are connected in series and said snubber circuit is connected across said series connected primary windings.

* * * * *